(12) United States Patent
Ozawa

(10) Patent No.: US 9,422,862 B2
(45) Date of Patent: Aug. 23, 2016

(54) COMBINED CYCLE POWER SYSTEM INCLUDING A FUEL CELL AND A GAS TURBINE

(71) Applicant: MITSUBISHI HITACHI POWER SYSTEMS, LTD., Kanagawa (JP)

(72) Inventor: Hiroyuki Ozawa, Tokyo (JP)

(73) Assignee: MITSUBISHI HITACHI POWER SYSTEMS, LTD., Kanagawa (JP)

( * ) Notice: Subject to any disclaimer, the term of this patent is extended or adjusted under 35 U.S.C. 154(b) by 683 days.

(21) Appl. No.: 13/766,913

(22) Filed: Feb. 14, 2013

(65) Prior Publication Data

US 2013/0221674 A1 Aug. 29, 2013

(30) Foreign Application Priority Data

Feb. 27, 2012 (JP) ................................. 2012-040335

(51) Int. Cl.
| | |
|---|---|
| F02C 1/00 | (2006.01) |
| F02C 3/28 | (2006.01) |
| F02C 6/00 | (2006.01) |
| H01M 8/04 | (2016.01) |

(52) U.S. Cl.
CPC ... *F02C 1/00* (2013.01); *F02C 3/28* (2013.01); *F02C 6/00* (2013.01); *Y02E 20/16* (2013.01)

(58) Field of Classification Search
CPC ................ F02C 3/28; F02C 1/00; F02C 6/00; H01M 8/04; H01M 8/10; H01M 8/04111; Y02E 20/16
See application file for complete search history.

(56) References Cited

U.S. PATENT DOCUMENTS

| | | | | |
|---|---|---|---|---|
| 6,159,626 A * | 12/2000 | Keskula | ............ | H01M 8/04223 429/429 |
| 6,413,661 B1 * | 7/2002 | Clingerman | ........ | B60L 11/1885 429/416 |
| 6,858,336 B2 * | 2/2005 | Reiser | ............... | H01M 8/04223 429/415 |
| 6,989,209 B2 * | 1/2006 | Sanderson | ........ | H01M 8/04022 429/415 |
| 7,178,337 B2 * | 2/2007 | Pflanz | ...................... | F03G 6/06 60/641.2 |
| 2004/0126724 A1 * | 7/2004 | Yamaguchi | ............. | F23C 13/00 431/2 |
| 2005/0079395 A1 * | 4/2005 | Varatharajan | ..... | H01M 8/04111 429/412 |
| 2005/0123813 A1 * | 6/2005 | Matoba | ............. | H01M 8/04007 429/415 |

(Continued)

FOREIGN PATENT DOCUMENTS

| | | |
|---|---|---|
| JP | 2004-119239 A | 4/2004 |
| JP | 2006-120385 A | 5/2006 |

(Continued)

*Primary Examiner* — Carlos A Rivera
(74) *Attorney, Agent, or Firm* — Kanesaka Berner and Partners LLP

(57) ABSTRACT

The combined cycle power system includes a fuel cell, a gas turbine, a fuel gas supply line, a compressed air supply line, a discharged fuel recirculation line, a discharged air supply line, a gas turbine fuel supply line, a discharged fuel atmospheric release line, a discharged air atmospheric release line, and a discharged fuel release bypass line in which a bypass on-off valve is provided in a flow passage that connects the discharged fuel atmospheric release line and the discharged fuel recirculation line downstream of the discharged fuel release source valve and downstream of the discharged fuel circulation source valve.

6 Claims, 5 Drawing Sheets

(56) References Cited

U.S. PATENT DOCUMENTS

| | | | | |
|---|---|---|---|---|
| 2005/0196659 A1* | 9/2005 | Grieve | F02C 1/05 | 429/415 |
| 2006/0051629 A1* | 3/2006 | Limbeck | H01M 4/92 | 429/429 |
| 2006/0093879 A1* | 5/2006 | Yang | H01M 8/04097 | 429/415 |
| 2006/0105207 A1* | 5/2006 | Lundberg | F01D 15/00 | 429/410 |
| 2006/0222919 A1* | 10/2006 | Tanaka | F02C 6/00 | 429/414 |
| 2006/0280993 A1* | 12/2006 | Keefer | F02B 43/10 | 429/435 |
| 2011/0033762 A1* | 2/2011 | Yoshida | H01M 8/04559 | 429/428 |
| 2013/0221675 A1* | 8/2013 | Ozawa | F02C 3/28 | 290/54 |
| 2014/0190144 A1* | 7/2014 | Ozawa | F02C 3/20 | 60/39.12 |
| 2014/0190173 A1* | 7/2014 | Ozawa | F01D 21/00 | 60/773 |
| 2014/0230450 A1* | 8/2014 | Ozawa | F02C 9/40 | 60/780 |

FOREIGN PATENT DOCUMENTS

| | | | |
|---|---|---|---|
| JP | 4802476 | B2 | 10/2011 |
| WO | 9829918 | A1 | 7/1998 |

\* cited by examiner

COMBINED CYCLE POWER SYSTEM INCLUDING A FUEL CELL AND A GAS TURBINE

RELATED APPLICATIONS

The present application is based on, and claims priority from, Japanese Application Number 2012-040335, filed Feb. 27, 2012, the disclosure of which is hereby incorporated by reference herein in its entirety.

FIELD OF THE INVENTION

The present invention relates to a fuel cell/gas turbine power system as a combined cycle power system in which a high-temperature fuel cell and a high-compression-ratio gas turbine are combined, and more particularly, to a technique for preventing deterioration associated with the operation shutdown of the high-temperature fuel cell.

DESCRIPTION OF THE RELATED ART

Fuel cells are devices which generate electricity by electrochemical reaction-based power generation, and have such characteristics as excellent generation efficiency and environmental responsiveness. The fuel cells are thus under development for practical use as an urban energy supply system for the 21st century.

Such fuel cells are composed of a fuel electrode as an electrode on a fuel side, an air electrode as an electrode on an air (oxidant) side, and an electrolyte located therebetween to allow only ion to pass therethrough. Various types of fuel cells have been developed based on the type of electrolyte.

Among the various types of fuel cells, a solid oxide fuel cell (referred to as "SOFC" below) is a fuel cell which is operated with natural gas, petroleum, methanol, coal-gasification gas, or the like as fuel by use of ceramics such as zirconia ceramics as an electrolyte. The SOFC has a high operating temperature of about 900 to 1000° C. so as to improve ion conductivity. The SOFC is known as a versatile and highly-efficient high-temperature fuel cell.

To prevent the deterioration of the SOFC due to reduction at an air electrode or oxidation at a fuel electrode associated with the stop of electricity generation, the fuel cell is protected by circulating inert gas such as nitrogen on the fuel electrode side after the operation shutdown of the fuel cell.

Japanese Laid-open Patent Publication No. 2006-120385 discloses a fuel cell system and an operating method thereof. A method for replacing gas with air in a fuel system by depressurization to almost a vacuum state is disclosed therein.

Discharged fuel discharged from the aforementioned SOFC has a high gas temperature. When the heat energy of discharged fuel is reused by a bottoming cycle such as a gas turbine and a steam turbine for use to generate electricity as disclosed in, for example, Japanese Laid-open Patent Publication No. 2004-119239, high generation efficiency can be obtained along with a small system loss. That is, the SOFC can be used in a fuel cell gas turbine power facility which generates electricity by a combination of a fuel cell and a gas turbine, and a combined cycle power facility which generates electricity by producing steam by an exhaust heat recovery boiler added to the above facility to reuse the exhaust heat of the gas turbine, and driving a steam turbine by the steam.

FIG. 5 are system diagrams illustrating a conventional depressurization example in an operation shutdown process of a combined cycle power system 1'. In the drawings, respective on-off valves in an open state are indicated by white color, and in a closed state, indicated by black color. In the case of the combined cycle power system 1' in FIG. 5, only a discharged fuel release source valve 81 is provided in the system of a discharged fuel recirculation line 50 and a discharged fuel atmospheric release line 80. Thus, a fuel electrode 11 in a high-temperature portion is in communication with the discharged fuel recirculation line 50 in a low-temperature portion in the shutdown process in FIG. 5(b).

Since the discharged fuel recirculation line 50 has a low initial temperature and a small heat capacity, a drain occurs along with a temperature decrease by depressurization. The drain occurring in the discharged fuel recirculation line 50 partially passes through the fuel electrode 11 in communication therewith and is released to the atmosphere due to the flow of discharged fuel (see an arrow f in the drawings) in the depressurization process. Thus, the drain occurring in the discharged fuel recirculation line 50 flows into the fuel electrode 11, so that the SOFC 10 is deteriorated, and there is an influence of the drain flowing into the fuel electrode 11 in the high-temperature portion.

SUMMARY OF THE INVENTION

In the combined cycle power system with the fuel cell using the SOFC and the gas turbine, the SOFC may be deteriorated due to the reduction at the air electrode and the oxidation at the fuel electrode in the shutdown of the SOFC. Thus, for example, nitrogen is used as the inert gas to purge the fuel electrode side. The purging by nitrogen expels combustible fuel gas from the fuel cell after the shutdown of the fuel cell in addition to cooling the fuel cell and preventing oxygen from entering the fuel electrode side. Such effect as to ensure safety is thereby obtained.

However, when the fuel cell/gas turbine power system has a large output, a larger amount of inert gas is required to replace gas on the fuel electrode side with the inert gas such as nitrogen. Thus, in the case of using nitrogen, a nitrogen gas supply facility using a liquid nitrogen which can supply a large capacity of nitrogen gas is required. The nitrogen gas supply facility as described above has a pressure to supply nitrogen gas of 0.9 MPa or less. Thus, an SOFC (an operating pressure: 1 MPa or more) combined with a high-compression-ratio gas turbine requires a compressor or the like for supplying high-pressure nitrogen gas.

That is, since the above conventional technique requires a large amount of high-pressure inert gas in the shutdown of the SOFC, the inert gas supply facility becomes complicated, and a larger amount of inert gas is consumed. Thus, the initial cost and the running cost of the entire system increase. The required amount of the inert gas is estimated to be about several tens $Nm^3/h$/a power output of SOFC (about 2000 to 5000 $Nm^3/h$ in a plant with a 100 MW SOFC).

Based on such circumstances, there is a demand for a fuel cell/gas turbine power system which uses no or a less amount of high-pressure inert gas in the shutdown of an SOFC.

The present invention has been made to make an improvement on the above circumstances, and it is an object thereof to provide a fuel cell/gas turbine power system which uses no or a less amount of high-pressure inert gas in the shutdown of an SOFC.

To achieve the above object, the present invention employs the following solutions.

A combined cycle power system according to a first aspect of the present invention includes: a fuel cell which generates electricity by an electrochemical reaction through an electrolyte upon supply of fuel gas and air; a gas turbine which is operated upon supply of discharged fuel and discharged air discharged from the fuel cell after the generation of electricity; a fuel gas supply line which includes a flow passage that supplies the fuel gas to a fuel electrode of the fuel cell, and a fuel inlet valve provided in the flow passage; a compressed air supply line which includes a flow passage that supplies air compressed by a compressor of the gas turbine to an air electrode of the fuel cell, and an air inlet valve provided in the flow passage; a discharged fuel recirculation line which includes a flow passage that connects the fuel electrode and the fuel gas supply line to circulate the discharged fuel, and a discharged fuel circulation source valve, a booster blower section, and a discharged fuel circulation outlet valve provided in the flow passage in order from an upstream side thereof; a discharged air supply line which includes a flow passage that supplies the discharged air from the air electrode to a combustor of the gas turbine, and a discharged air outlet valve provided in the flow passage; a gas turbine fuel supply line which includes a flow passage that branches from the discharged fuel recirculation line between the discharged fuel circulation source valve and the booster blower section to supply a portion of the discharged fuel to the combustor, and a discharged fuel supply source valve provided in the flow passage; a discharged fuel atmospheric release line which includes a flow passage that branches from the discharged fuel recirculation line upstream of the discharged fuel circulation source valve, and a discharged fuel release source valve provided in the flow passage; a discharged air atmospheric release line which includes a flow passage that branches from the discharged air supply line upstream of the discharged air outlet valve, and a discharged air release source valve provided in the flow passage; and a discharged fuel release bypass line which includes a flow passage that connects the discharged fuel atmospheric release line and the discharged fuel recirculation line downstream of the discharged fuel release source valve and downstream of the discharged fuel circulation source valve, and a bypass on-off valve provided in the flow passage.

The combined cycle power system having the above configuration includes: the discharged air atmospheric release line in which the discharged air release source valve is provided in the flow passage that branches from the discharged air supply line upstream of the discharged air outlet valve; and the discharged fuel release bypass line in which the bypass on-off valve is provided in the flow passage that connects the discharged fuel atmospheric release line and the discharged fuel recirculation line downstream of the discharged fuel release source valve and downstream of the discharged fuel circulation source valve. Thus, the fuel inlet valve, the discharged fuel circulation source valve, the discharged fuel circulation outlet valve, the air inlet valve, and the discharged air outlet valve in an open state are closed at the same time as the operation shutdown of the fuel cell. The circulation of the fuel, the compressed air, the discharged fuel, and the discharged air can be thereby blocked between a high-temperature portion inside (the fuel electrode, the air electrode or the like) and around the fuel cell, and a low-temperature portion of the outside of the fuel cell.

The discharged fuel release source valve, the bypass on-off valve, and the discharged air release source valve in a closed state are also opened at the same time as the operation shutdown of the fuel cell. The discharged fuel and the discharged air can be thereby released to outside of the high-temperature portion, so that the high-temperature portion can be rapidly depressurized.

A combined cycle power system according to a second aspect of the present invention includes: a fuel cell which generates electricity by an electrochemical reaction through an electrolyte upon supply of fuel gas and air; a gas turbine which is operated upon supply of discharged fuel and discharged air discharged from the fuel cell after the generation of electricity; a fuel gas supply line which includes a flow passage that supplies the fuel gas to a fuel electrode of the fuel cell, and a fuel inlet valve provided in the flow passage; a compressed air supply line which includes a flow passage that supplies air compressed by a compressor of the gas turbine to an air electrode of the fuel cell, and an air inlet valve provided in the flow passage; a discharged fuel recirculation line which includes a flow passage that connects the fuel electrode and the fuel gas supply line to circulate the discharged fuel, and a discharged fuel circulation source valve, a booster blower section, and a discharged fuel circulation outlet valve provided in the flow passage in order from an upstream side thereof; a discharged air supply line which includes a flow passage that supplies the discharged air from the air electrode to a combustor of the gas turbine, and a discharged air outlet valve provided in the flow passage; a gas turbine fuel supply line which includes a flow passage that branches from the discharged fuel recirculation line between the discharged fuel circulation source valve and the booster blower section to supply a portion of the discharged fuel to the combustor, and a discharged fuel supply source valve provided in the flow passage; a discharged fuel atmospheric release line which includes a flow passage that branches from the discharged fuel recirculation line upstream of the discharged fuel recirculation source valve, and a pressure loss element and a discharged fuel release source valve provided in the flow passage in order from an upstream side thereof; a discharged air atmospheric release line which includes a flow passage that branches from the discharged air supply line upstream of the discharged air outlet valve, and a discharged air release source valve provided in the flow passage; and a discharged fuel release bypass line as a flow passage that connects the discharged fuel atmospheric release line and the discharged fuel recirculation line between the pressure loss element and the discharged fuel release source valve and downstream of the discharged fuel circulation source valve.

The combined cycle power system having the above configuration includes: the discharged fuel atmospheric release line in which the pressure loss element and the discharged fuel release source valve are provided in order from the upstream side in the flow passage that branches from the discharged fuel recirculation line upstream of the discharged fuel circulation source valve; the discharged air atmospheric release line in which the discharged air release source valve is provided in the flow passage that branches from the discharged air supply line upstream of the discharged air outlet valve; and the discharged fuel release bypass line as the flow passage that connects the discharged fuel atmospheric release line and the discharged fuel recirculation line between the pressure loss element and the discharged fuel release source valve and downstream of the discharged fuel circulation source valve. Thus, the fuel inlet valve, the discharged fuel circulation source valve, the discharged fuel circulation outlet valve, the air inlet valve, and the discharged air outlet valve in an open state are closed at the same time as the operation shutdown of the fuel cell. The circulation of the fuel, the compressed air, the discharged fuel, and the discharged air can be thereby blocked between a high-temperature portion inside and around the fuel cell, and a low-temperature portion of the outside of the fuel cell. The discharged fuel release source valve and the discharged air release source valve in a closed state are also opened at the same time as the operation shutdown of the fuel cell. The discharged fuel and the discharged air can be thereby released to outside of the high-temperature portion, so that the high-temperature portion can be rapidly depressurized. Since the pressure loss element is provided in the discharged fuel atmospheric release line, the discharged fuel can be released to the atmosphere while the pressure of the high-temperature portion where the release flow passage has a large pressure loss is being maintained higher than that of the low-temperature side, that is, while the flow of the released discharged fuel is prevented from entering the high-temperature (high-pressure) side from the low-temperature (low-pressure) side.

In the above combined cycle power system, the compressed air supply line includes a cooling air supply line which includes a flow passage connected to the compressed air supply line downstream of the air inlet valve. Accordingly, cooling of an air electrode system in the high-temperature portion can be enhanced by circulating cooling air after depressurizing and shutting down the fuel cell.

In the above combined cycle power system, the discharged fuel recirculation line may preferably include a replacement gas supply line which includes a flow passage connected to the discharged fuel recirculation line upstream and downstream of the discharged fuel circulation outlet valve. Accordingly, cooling of a fuel system in the high-temperature portion can be enhanced, and combustible gas or steam can be replaced by circulating replacement gas after depressurizing and shutting down the fuel cell.

In this case, two types of gases: inert gas such as nitrogen and air may be prepared as the replacement gas, and the two types of gasses may be selectively switched in a phased manner. To be more specific, the cooling is performed with the inert gas at a high temperature time after the depressurization shutdown, and with the air after the temperature is decreased to some extent.

A method for operating a combined cycle power system according to a third aspect of the present invention is a method for operating a combined cycle power system including a fuel cell, and a gas turbine that is operated when discharged fuel and discharged air discharged from the fuel cell are supplied to a combustor, the method including the steps of: stopping supply of fuel and air to the fuel cell; blocking circulation of gas between a fuel gas supply line and a discharged fuel recirculation line of the fuel cell; and releasing fuel gas and discharged fuel gas in the fuel gas supply line and the discharged fuel recirculation line to the outside to depressurize and shut down the fuel cell.

In accordance with the method for operating a combined cycle power system, the supply of fuel and air to the fuel cell is stopped, the circulation of gas between the fuel gas supply line and the discharged fuel recirculation line of the fuel cell is blocked, and the fuel gas and the discharged fuel gas in the fuel gas supply line and the discharged fuel recirculation line are released to outside to depressurize and shut down the fuel cell. Thus, a high-temperature portion having a high temperature and a large heat capacity can be rapidly depressurized with the high-temperature portion being separated from an external low-temperature portion.

Thus, in the high-temperature portion of the fuel cell, gas inside the system (discharged fuel and discharged air) is released to outside of the system such as the atmosphere at the same time as the operation shutdown. Accordingly, a pressure decrease by the rapid depressurization of the gas inside the system, and a temperature decrease by expansion of the gas inside the system are quickly achieved to satisfy deterioration suppression conditions (the pressure and the temperature) for the fuel cell. The deterioration of the fuel cell, that is, reduction at the air electrode and oxidation at the fuel cell can be more effectively suppressed as the pressure and the temperature of the gas inside the system are lower.

Even when drain occurs in the low-temperature portion of the outside of the fuel cell, the drain does not flow into the high-temperature portion inside and around the fuel cell which are separated therefrom.

In the above aspect, the method may further include the step of: blocking circulation of gas between an air supply line and a discharged air supply line of the fuel cell at the same time as blocking the circulation of gas between the fuel gas supply line and the discharged fuel recirculation line of the fuel cell, wherein in the releasing step, air in the air supply line is released to outside to depressurize and shut down the fuel cell.

In the above aspect, first-stage cooling means which supplies first replacement gas to the fuel gas supply line after the fuel cell is depressurized and shut down, and second-stage cooling means which supplies second replacement gas to the fuel gas supply line after the first-stage cooling means may be provided.

In this case, the first replacement gas may be inert gas, and the second replacement gas may be air. Accordingly, the cooling can be performed with a minimum amount of inert gas.

In the aforementioned present invention, the high-temperature fuel cell such as an SOFC uses no or a less amount of high-pressure nitrogen gas when shut down. The initial cost and the running cost of the entire fuel cell/gas turbine power system can be thereby reduced.

In the shutdown of the fuel cell, the inside of the fuel cell can be rapidly depressurized to decrease the temperature, and the drain can be prevented from occurring in the fuel cell or entering into the fuel cell from outside. Consequently, the fuel cell can be protected by suppressing the deterioration of the fuel cell (the reduction at the air electrode and the oxidation at the fuel electrode).

BRIEF DESCRIPTION OF THE DRAWINGS

FIG. 1(a) shows a valve on-off state in electricity generation; and FIG. 1(b) shows a valve on-off state in a shutdown process (shutdown of a fuel cell).

FIG. 2(a) shows a valve on-off state in electricity generation; FIG. 2(b) shows a valve on-off state in a shutdown process of a fuel cell; and FIG. 2(c) shows a valve on-off state in a shutdown process of a piping system.

FIG. 4(a) shows a valve on-off state in electricity generation; and FIG. 4(b) shows a valve on-off state in a shutdown process (shutdown of a fuel cell).

FIG. 5(a) shows a valve on-off state in electricity generation; and FIG. 5(b) shows a valve on-off state in a shutdown process (shutdown of a fuel cell).

DESCRIPTION OF EMBODIMENTS

In the following, an embodiment of a combined cycle power system according to the present invention will be described based on the drawings.

Figure 1:
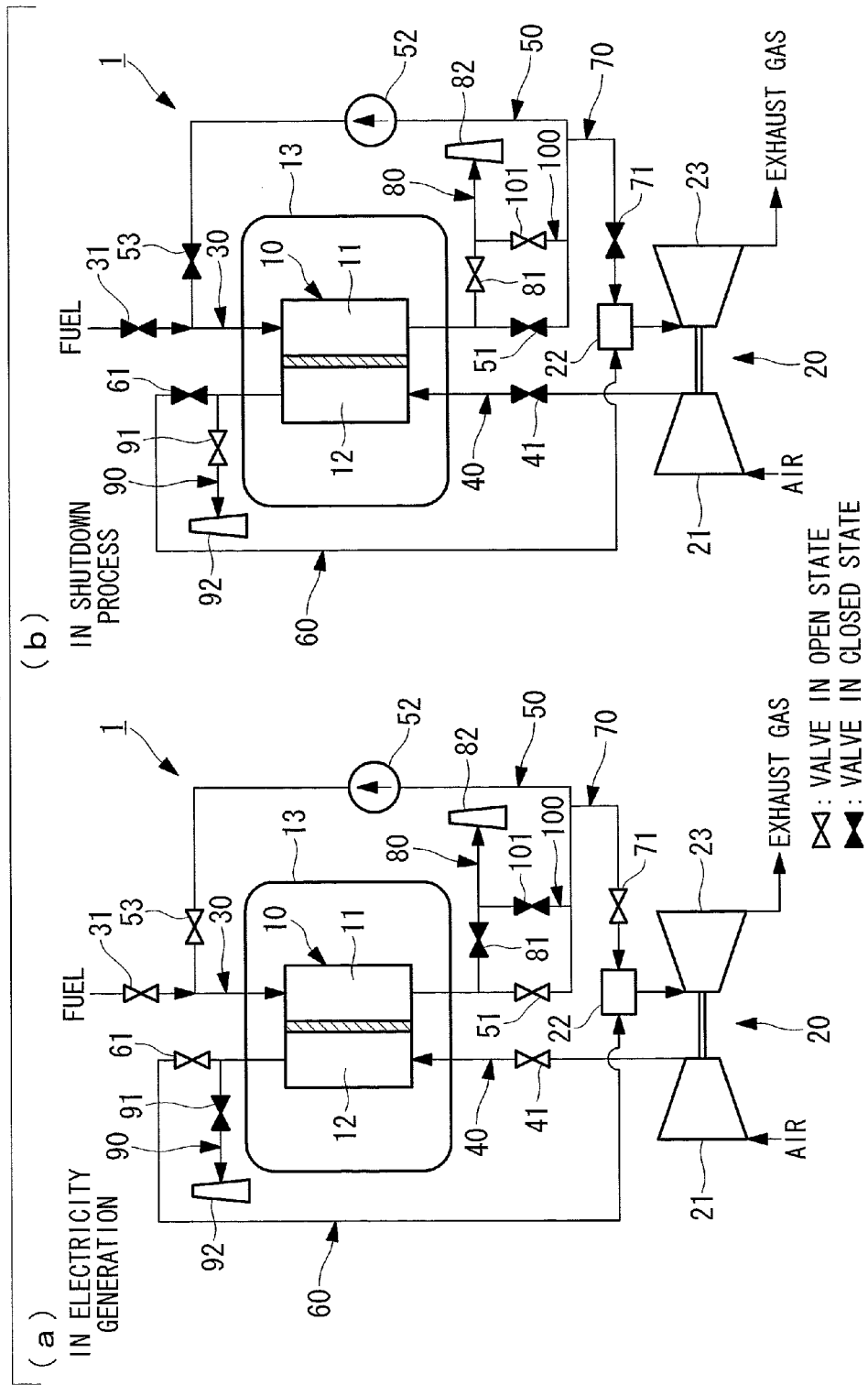
FIG. 1 are system diagrams illustrating an embodiment of a combined cycle power system according to the present invention.

A fuel cell/gas turbine power system (referred to as "combined cycle power system" below) 1 according to the embodiment shown in FIG. 1 effectively generates electricity by a combination of a high-temperature fuel cell 10 and a gas turbine 20. That is, the fuel cell 10 generates electricity by an electrochemical reaction through an electrolyte upon supply of fuel gas and air. In addition to the fuel cell 10, the gas turbine 20 is operated by introducing therein high-temperature discharged fuel and discharged air discharged from the fuel cell 10 after the generation of electricity. The gas turbine 20 thereby drives a generator (not shown) coupled to an output shaft of the gas turbine 20 to generate electricity.

When high-temperature combustion exhaust gas discharged from the gas turbine 20 is further introduced into an exhaust heat recovery boiler, a combined cycle power system which generates electricity with a combination of a steam turbine, the fuel cell and the gas turbine can be constructed.

In the following, the combined cycle power system 1 which employs a solid oxide fuel cell (SOFC) as the above high-temperature fuel cell 10 will be described. The SOFC 10 is operated (generates electricity) with natural gas, petroleum, methanol, coal-gasification gas or the like as fuel by use of ceramics such as zirconia ceramics as an electrolyte. The SOFC 10 is set to a high operating temperature of about 900 to 1000° C. so as to improve ion conductivity.

The SOFC 10 in the drawings includes a plurality of electrodes: a fuel electrode 11 and an air electrode 12. The entire SOFC 10 is stored within a pressure vessel 13.

Fuel such as natural gas is supplied to the fuel electrode 11 from a fuel gas supply line 30. A portion of high-temperature discharged fuel used for an electrochemical reaction flows into a discharged fuel recirculation line 50. A fuel inlet valve 31 that opens and closes a flow passage through which the fuel gas flows is provided in the fuel gas supply line 30. A discharged fuel circulation source valve 51, a booster blower section 52, and a discharged fuel circulation outlet valve 53 described below are provided in the discharged fuel recirculation line 50.

Air is supplied to the air electrode 12 from a compressed air supply line 40. High-temperature discharged air used for an electrochemical reaction is discharged to a discharged air supply line 60. The compressed air supply line 40 is connected to a compressor 21 of the gas turbine 20 described below. The discharged air supply line 60 is connected to a combustor 22 of the gas turbine 20. An air inlet valve 41 that opens and closes a flow passage for compressed air is provided in the compressed air supply line 40 as the flow passage. A discharged air outlet valve 61 that opens and closes a flow passage for discharged air is provided in the discharged air supply line 60 as the flow passage.

The gas turbine 20 includes the compressor 21, the combustor 22, and a turbine 23. In this case, the gas turbine 20 is operated upon supply of the high-temperature discharged fuel and the high-temperature discharged air discharged from the SOFC 10.

The compressor 21 is driven by the output of the turbine 23 to supply the compressed air compressed by sucking air (outside air) to the air electrode 12 of the SOFC 10 connected via the compressed air supply line 40. The compressed air supply line 40 thus works as a flow passage that supplies the air compressed by the compressor 21 to the air electrode 12.

The discharged air is supplied to the combustor 22 from the discharged air supply line 60. The high-temperature discharged fuel is also supplied to the combustor 22 from a gas turbine fuel supply line 70 that branches from the discharged fuel recirculation line 50. The combustor 22 burns the discharged fuel by using the discharged air to generate high-temperature and high-pressure combustion gas, and supplies the combustion gas to the turbine 23. A discharged fuel supply source valve 71 that opens and closes a flow passage through which the discharged fuel flows is provided in the fuel supply line 70.

The turbine 23 converts the energy of the combustion gas supplied from the combustor 22 to a shaft output, and outputs the shaft output. The shaft output of the turbine 23 is used for driving the compressor 21 and the generator (not shown).

The discharged fuel recirculation line 50 is a flow passage that connects the fuel electrode 11 and the fuel gas supply line 30 to circulate the discharged fuel. The discharged fuel circulation source valve 51, the booster blower section 52, and the discharged fuel circulation outlet valve 53 are provided therein in order from the upstream fuel electrode 11. That is, the discharged fuel recirculation line 50 is a flow passage that recirculates, as the discharged fuel, the fuel gas discharged from the fuel electrode 11 after the SOFC 10 generates electricity. The flow passage branches in the middle to supply a portion of the discharged fuel to the combustor 22 of the gas turbine 20. The remaining discharged fuel is reused by joining the fuel gas supplied through the fuel gas supply line 30.

The discharged fuel circulation source valve 51 and the discharged fuel circulation outlet valve 53 are on-off valves provided to open and close the flow passage through which the discharged fuel passes.

The booster blower section 52 is an air blower or a compressor provided to boost the pressure of the discharged fuel and cause the discharged fuel to join the fuel gas. The discharged fuel whose pressure is boosted in the booster blower section 52 joins the fuel gas having a higher pressure than that of the discharged fuel and flowing through the fuel gas supply line 30 so as to be compressed into the flow of the fuel gas.

A discharged fuel atmospheric release line 80 that branches upstream of the discharged fuel circulation source valve 51 is connected to the discharged fuel recirculation line 50. The discharged fuel atmospheric release line 80 is a flow passage that releases the high-temperature discharged fuel to outside of the fuel electrode 11 and its peripheral portion in the operation shutdown of the SOFC 10. The discharged fuel atmospheric release line 80 includes a discharged fuel release source valve 81 that opens and closes the flow passage. In a configuration example in the drawings, when the discharged fuel release source valve 81 is opened, the discharged fuel is released to the atmosphere from a stack 82 connected to the discharged fuel atmospheric release line 80.

A discharged air atmospheric release line 90 that branches upstream of the discharged air outlet valve 61 is connected to the discharged air supply line 60. The discharged air atmospheric release line 90 is a flow passage that releases the discharged air of the air electrode 12 and its peripheral portion to outside in the operation shutdown of the SOFC 10. The discharged air atmospheric release line 90 includes a discharged air release source valve 91 that opens and closes the flow passage. In the configuration example in the drawings, when the discharged air release source valve 91 is opened, the discharged air is released to the atmosphere from a stack 92 connected to the discharged air atmospheric release line 90.

The discharged fuel atmospheric release line 80 and the discharged fuel recirculation line 50 are connected together via a discharged fuel release bypass line 100 downstream of the discharged fuel release source valve 81 and downstream of the discharged fuel circulation source valve 51. The discharged fuel release bypass line 100 is a flow passage that releases the discharged fuel in the discharged fuel recirculation line 50 to outside in the operation shutdown of the SOFC 10. The discharged fuel release bypass line 100 includes a bypass on-off valve 101 that opens and closes the flow passage. In the configuration example in the drawings, when the bypass on-off valve 101 is opened, the discharged fuel is released to the atmosphere from the stack 82 connected to the discharged fuel atmospheric release line 80.

In the combined cycle power system 1 having the above configuration, the discharged fuel release source valve 81, the discharged air release source valve 91, and the bypass on-off valve 101 are closed (indicated by black color) in the case of "IN ELECTRICITY GENERATION" shown in FIG. 1(a). The other valves in the drawing are opened (indicated by white color).

In the state of "IN ELECTRICITY GENERATION", the fuel gas and the discharged fuel are supplied to the fuel electrode 11 of the SOFC 10, and the compressed air is supplied to the air electrode 12, thereby generating electricity.

The discharged fuel and the discharged air are also supplied to the combustor 22 of the gas turbine 20. The turbine 23 is thereby rotated by the high-temperature and high-pressure combustion gas. The generator is driven by the shaft output of the turbine 23, thereby generating electricity.

However, when the operation of the combined cycle power system 1 is shut down, the on-off states of the respective on-off valves are switched as shown in "IN SHUTDOWN PROCESS" in FIG. 1(b).

To be more specific, the fuel inlet valve 31, the air inlet valve 41, the discharged fuel circulation source valve 51, the discharged fuel circulation outlet valve 53, the discharged air outlet valve 61, and the discharged fuel supply source valve 71 in an open state "IN ELECTRICITY GENERATION" are closed. At substantially the same time as the closing operation, the discharged fuel release source valve 81, the discharged air release source valve 91, and the bypass on-off valve 101 in a closed state are opened.

As a result, the discharged fuel in a high-temperature portion, that is, the high-temperature discharged fuel in the fuel electrode 11 and its peripheral flow passages (a region surrounded by the fuel inlet valve 31, the discharged fuel circulation source valve 51, and the discharged fuel circulation outlet valve 53) is released to the atmosphere from the stack 82 through the discharged fuel atmospheric release line 80. The inside of the fuel electrode 11 is thereby rapidly depressurized by the release of the high-temperature discharged fuel.

Moreover, the discharged fuel in a low-temperature portion, that is, the discharged fuel within the discharged fuel recirculation line 50 between the discharged fuel circulation source valve 51 and the discharged fuel circulation outlet valve 53 is released to the atmosphere from the stack 82 through the discharged fuel release bypass line 100 and the discharged fuel atmospheric release line 80.

Meanwhile, the discharged air in the high-temperature portion, that is, the high-temperature discharged air within the air electrode 12 and its peripheral flow passages is released to the atmosphere from the stack 92 through the discharged air atmospheric release line 90. The inside of the air electrode 12 is thereby rapidly depressurized by the release of the high-temperature discharged air.

The temperatures of the discharged fuel and the discharged air in the low-temperature portion as a peripheral piping section connected to the high-temperature portion are lower than those of the high-temperature portion in and around the reacting section of SOFC 10.

As described above, in the combined cycle power system 1 having the above configuration, the circulation of the fuel, the compressed air, the discharged fuel, and the discharged air is blocked between the high-temperature portion of the inside and around the SOFC 10 and the low-temperature portion of the outside of the SOFC 10, and the discharged fuel and the discharged air are also released to outside of the high-temperature portion by operating the respective on-off valves at the same time as the operation shutdown of the SOFC 10. The SOFC 10 can be thereby depressurized and shut down. The operation as described above is an effective method for shutting down the combined cycle power system 1.

That is, reduction at the air electrode 12 and oxidation at the fuel electrode 11 are more effectively suppressed as the pressure is lower and the temperature is lower. When the high-temperature discharged fuel and the high-temperature discharged air are released to outside of the SOFC 10 at the same time as the operation shutdown, the fuel electrode 11, the air electrode 12, and their peripheral portions can be rapidly depressurized. Accordingly, in the above combined cycle power system 1, a pressure decrease by the rapid depressurization and a temperature decrease by expansion of the discharged fuel (gas) associated with the pressure decrease are quickly achieved to obtain a low-temperature and low-pressure depressurized shutdown state that satisfies deterioration suppression conditions for the SOFC 10. The deterioration of the fuel cell can be thereby suppressed.

The temperature of the low-temperature portion, such as the discharged fuel recirculation line 50, whose temperature is low rather than the high-temperature portion may be decreased to a saturated temperature or less by the depressurization. Drain may thereby occur. When the drain occurs in or flows into the SOFC 10, the SOFC 10 may be deteriorated.

To make an improvement on the above circumstance, in the above combined cycle power system 1 and its fuel cell protection method, the depressurization is performed after separating the SOFC 10 (the high-temperature portion) in which the drain does not occur because of the high temperature even when the pressure is decreased, and the peripheral low-temperature portion in which the drain possibly occurs due to the low temperature from each other by opening or closing the on-off valves provided in the respective lines. The occurrence of the drain within the SOFC 10 can be thereby prevented. Accordingly, the durability and reliability of the SOFC 10 and the combined cycle power system 1 having the SOFC 10 are improved.

In the above combined cycle power system 1 and the fuel cell protection method according to the present embodiment, the discharged fuel circulation source valve 51 and the discharged fuel circulation outlet valve 53 of the discharged fuel recirculation line 50, and the discharged fuel release bypass line 100 in which the bypass on-off valve 101 is provided are added. The drain occurring in the discharged fuel recirculation line 50 is thereby prevented from flowing into the fuel electrode 11, so that the deterioration of the SOFC 10 is suppressed and the influence of the drain flowing into the fuel electrode 11 in the high-temperature portion is eliminated.

Figure 2:
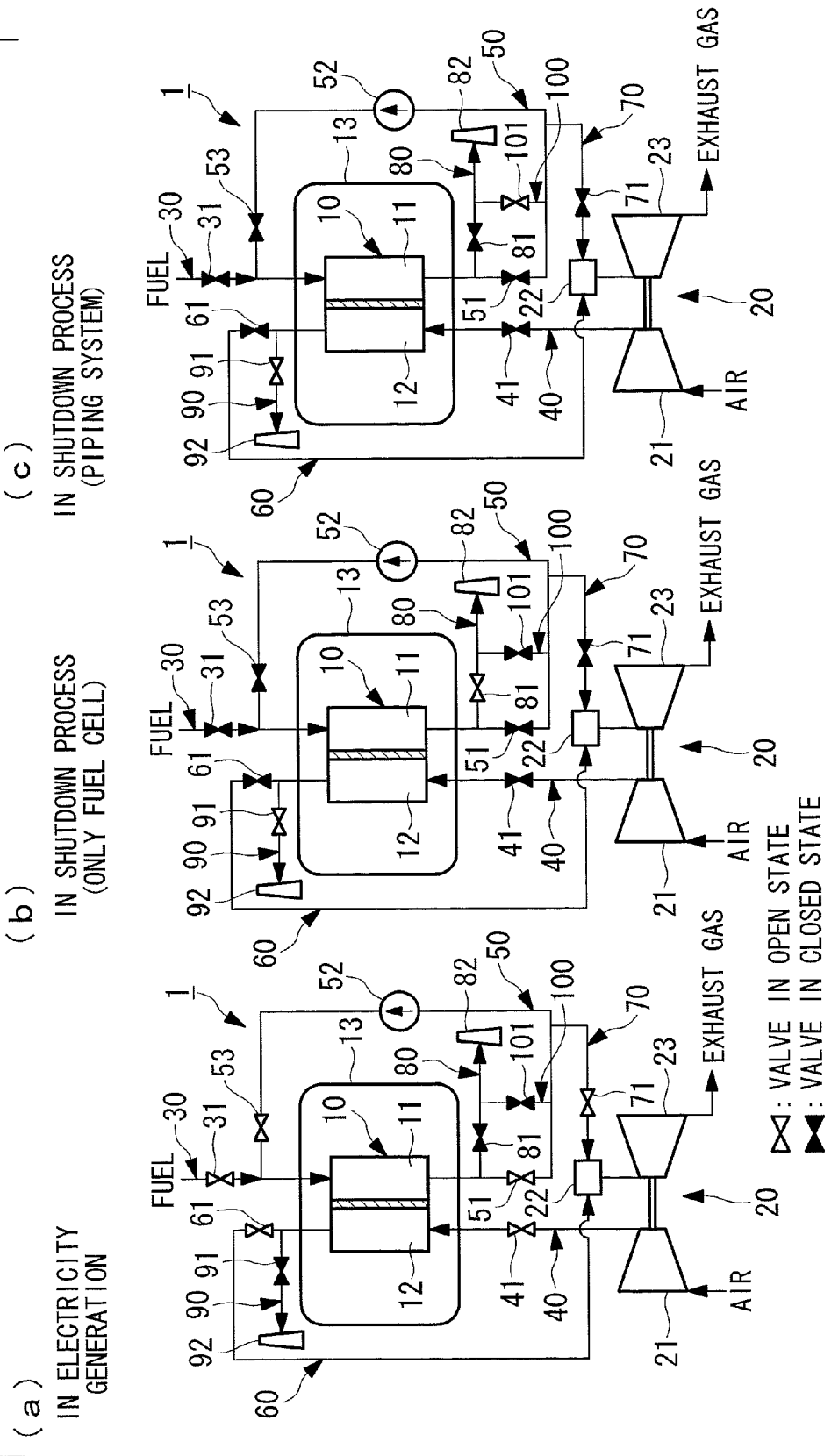
FIG. 2 are system diagrams illustrating a first modification of the combined cycle power system shown in FIG. 1.

The discharged fuel may be released through two stages in the shutdown of the SOFC as in a first modification shown in FIG. 2. That is, the discharged fuel is preferably released from the high-temperature portion inside the SOFC 10 (mainly, the fuel electrode 11) in the first stage, and from the peripheral low-temperature portion of the outside of the SOFC (mainly, the discharged fuel recirculation line 50) in the second stage.

To be more specific, in the first stage of "IN SHUTDOWN PROCESS (ONLY FUEL CELL)" shown in FIG. 2(b), the bypass valve of the discharged fuel release bypass line 100 is closed to separate the discharged fuel atmospheric release line 80 and the discharged fuel recirculation line 50 from each other. Thus, in the first stage, the high-temperature discharged fuel inside the fuel electrode 11 in communication with the discharged fuel atmospheric release line 80 is released to the atmosphere.

In the second stage of "IN SHUTDOWN PROCESS (PIPING SYSTEM)" shown in FIG. 2(*c*), the discharged fuel release source valve 81 is closed, and the bypass valve of the discharged fuel release bypass line 100 is opened, to separate the fuel electrode 11 and the discharged fuel atmospheric release line 80 from each other. The discharged fuel recirculation line 50 thereby communicates with the discharged fuel atmospheric release line 80 via the discharged fuel release bypass line 100. Thus, in the second stage, the low-temperature discharged fuel inside the discharged fuel recirculation line 50 in communication with the discharged fuel atmospheric release line 80 is released to the atmosphere.

By releasing the discharged fuel through the two stages as described above, only the SOFC 10 which may be deteriorated by a high pressure when a pressurized state is maintained is depressurized without depressurizing the discharged fuel recirculation line 50 in the shutdown of the SOFC. The occurrence of the drain in the discharged fuel recirculation line 50 can be thereby prevented.

That is, only the fuel electrode 11 of the SOFC 10 which may be deteriorated by a high pressure when a pressurized state is maintained is depressurized in the first stage without depressurizing the discharged fuel recirculation line 50 in the operation shutdown of the SOFC. As a result, the pressure and the temperature of the discharged fuel recirculation line 50 are maintained, so that the occurrence of the drain can be prevented. Before the drain occurs in the discharged fuel recirculation line 50 due to natural heat dissipation, the release in the second stage is performed while the pressurized state within the flow passage of the discharged fuel recirculation line 50 is being maintained. Accordingly, the occurrence of the drain can be reliably prevented.

Figure 3:
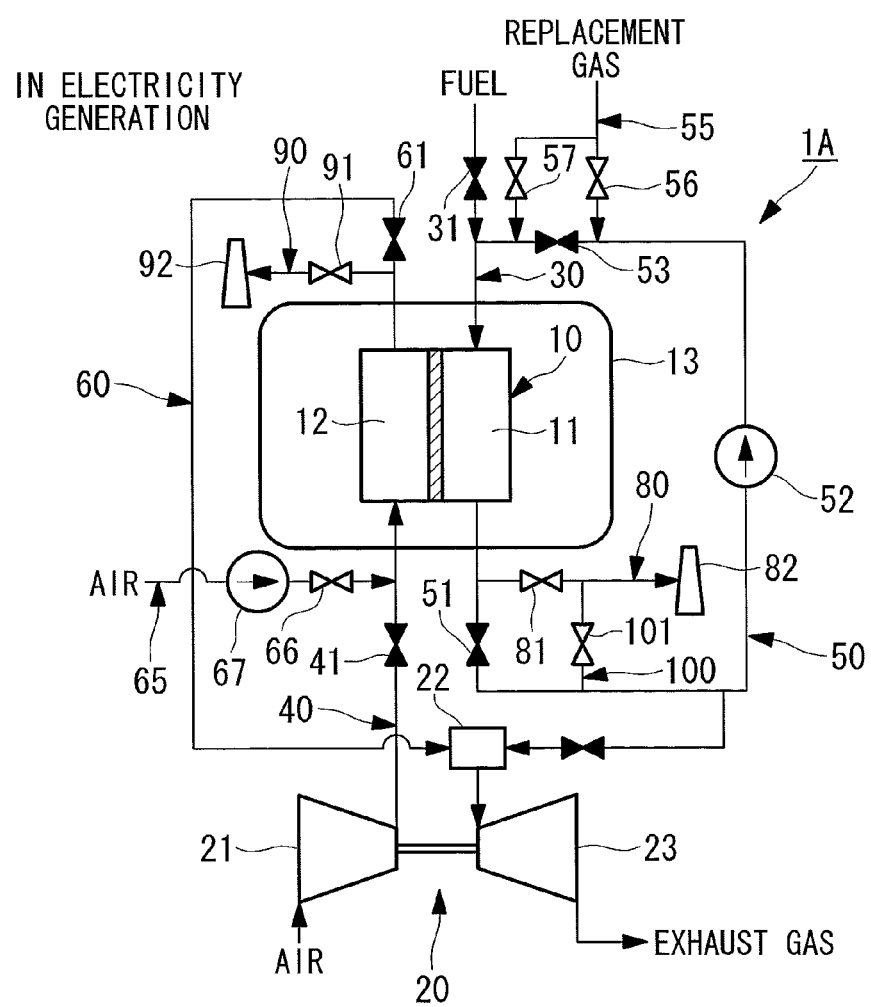
FIG. 3 is a system diagram illustrating a second modification of the combined cycle power system shown in FIG. 1.

The combined cycle power system 1 according to the aforementioned embodiment may also employ a configuration according to a second modification as shown in FIG. 3, for example. In the second modification shown in FIG. 3, the same portions as those in the aforementioned embodiment are assigned the same reference numerals, and the detailed description is omitted.

In a combined cycle power system 1A shown in FIG. 3, the compressed air supply line 40 includes a cooling air supply line 65 in which a source valve 66 is provided in a flow passage connected to the downstream side of the air inlet valve 41. To enhance the cooling of the air electrode system in the high-temperature portion, the cooling air supply line 65 supplies cooling air such as outside air into the air electrode 12 after the depressurization shutdown by air blowing means such as a fan 67. The cooling air supply line 65 can effectively reduce a cooling time length.

In the combined cycle power system 1A according to the second modification shown in FIG. 3, the discharged fuel recirculation line 50 also includes a replacement gas supply line 55 in which source valves 56 and 57 are respectively provided in flow passages connected to the upstream side and the downstream side of the discharged fuel circulation outlet valve 53. To enhance the cooling of the fuel electrode system in the high-temperature portion, the replacement gas supply line 55 supplies replacement gas such as inert gas and cooling air into the fuel electrode 11 and the discharged fuel recirculation line 50 after the combined cycle power system 1 according to the aforementioned embodiment is depressurized and shut down. The replacement gas supply line 55 can effectively replace the combustible gas and prevent the occurrence of the drain resulting from the temperature decrease after the depressurization shutdown by circulating the replacement gas to replace the gas in the respective lines after the depressurization shutdown of the SOFC. The replacement gas is preferably supplied in a state in which the SOFC 10 is shut down with the pressure being depressurized to 0.9 MPa or less.

Two types of gasses: inert gas such as nitrogen and air may be prepared as the replacement gas used in this case, and the two types of gasses may be selectively switched in a phased manner. The fuel cell can be thereby shut down in a shorter length of time. That is, the SOFC 10 may be cooled by circulating the inert gas in the fuel electrode system in the high-temperature portion after the depressurization shutdown. After the temperature is decreased to a temperature at which the fuel electrode is not reoxidized, the air may be used for cooling. The cooling may be performed through the two stages as described above. Since the cooling with the inert gas is performed in a high-temperature state (300 to less than 600° C.) in the first stage, and the cooling with the air is performed in a state in which the temperature is decreased to some extent (e.g., less than 300° C.) in the second stage, the occurrence of the drain by cooling is prevented. High safety can be obtained by the cooling with the inert gas. Also, the cooling can be performed with a minimum amount of inert gas since the air is used after the temperature decrease. If the temperature of the fuel cell is decreased to the temperature at which the fuel electrode is not reoxidized by the depressurization shutdown of the fuel cell, the fuel cell may be cooled only by supplying the air.

Although both the replacement gas supply line 55 and the cooling air supply line 65 are provided in the configuration example as shown in the drawing, the replacement gas supply line 55 and the cooling air supply line 65 may be appropriately selected. For example, only the replacement gas supply line 55 may be provided.

Figure 4:
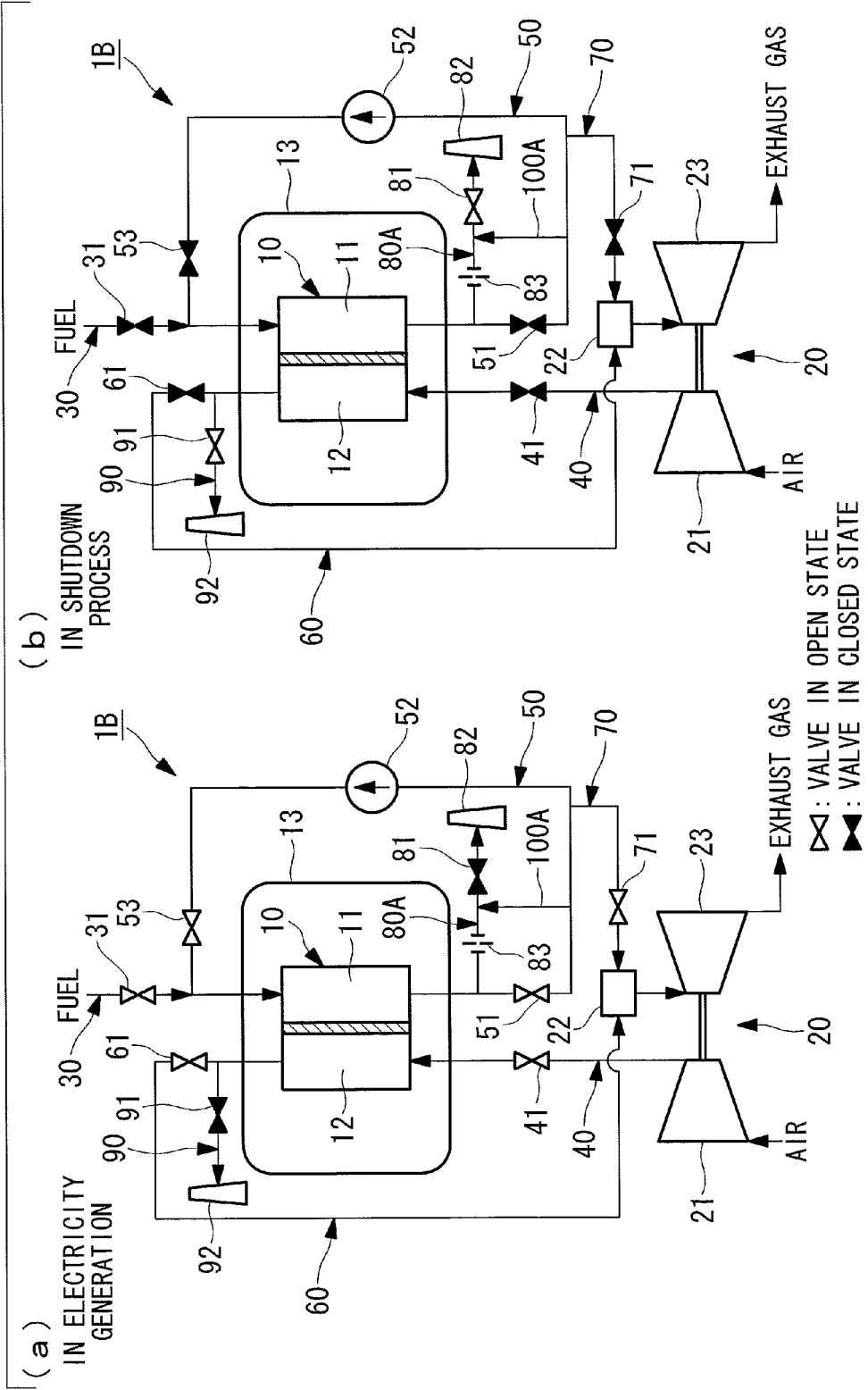
FIG. 4 are system diagrams illustrating another embodiment of the combined cycle power system according to the present invention.
Figure 5:
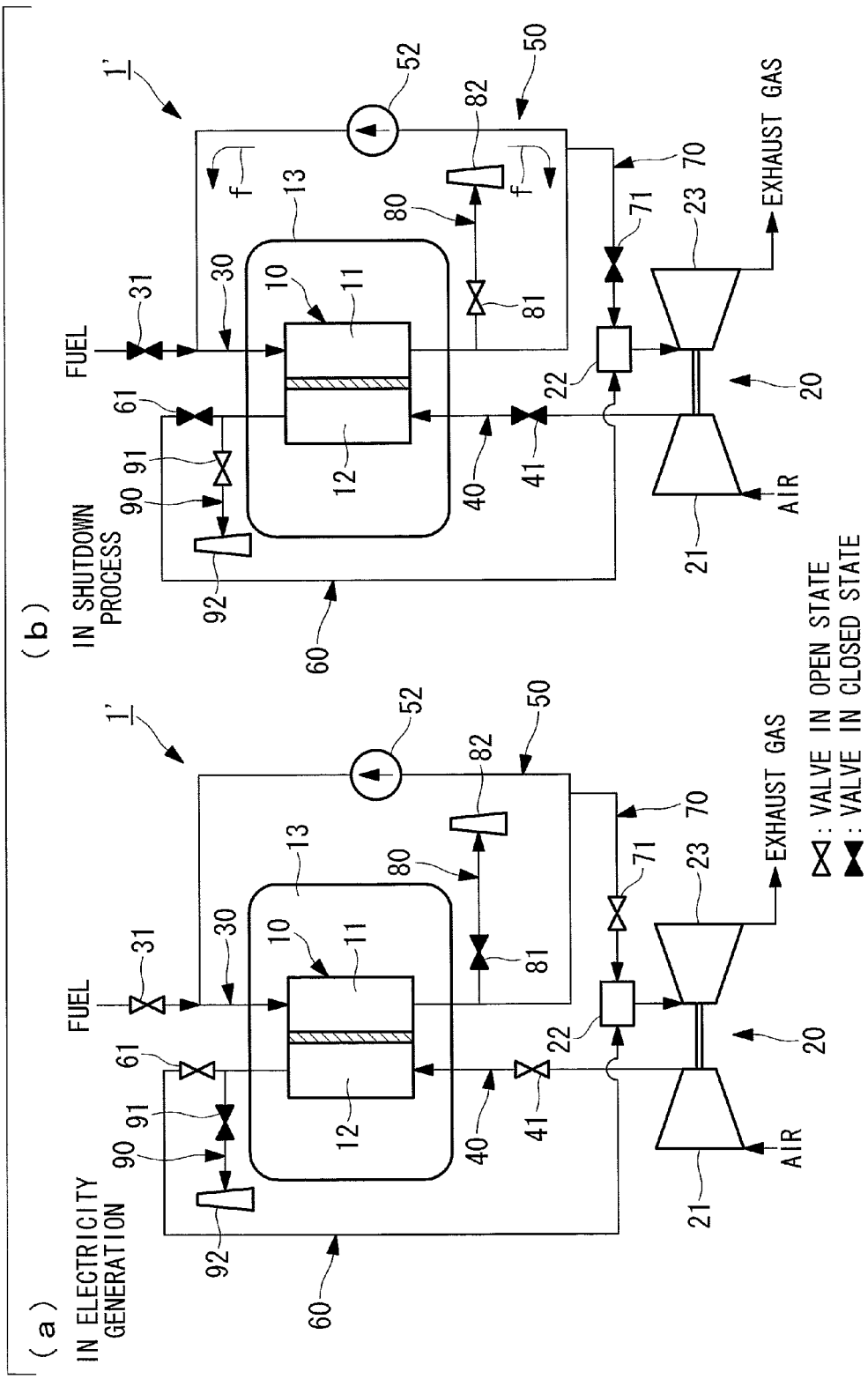
FIG. 5 are system diagrams illustrating a conventional depressurization example in a combined cycle power system.

Next, another embodiment of the aforementioned power system and the fuel cell protection method will be described based on FIG. 4. The same portions as those of the aforementioned embodiment may be assigned the same reference numerals, and the detailed description is omitted.

In a combined cycle power system 1B described in the present embodiment, an orifice (a pressure loss element) 83 and the discharged fuel release source valve 81 are provided in order from the upstream side in a discharged fuel atmospheric release line 80A. The discharged fuel atmospheric release line 80A is a flow passage that branches from the discharged fuel recirculation line 50 upstream of the discharged fuel circulation source valve 51. A discharged fuel release bypass line 100A as a flow passage connects the discharged fuel atmospheric release line 80A and the discharged fuel recirculation line 50 between the orifice 83 and the discharged fuel release source valve 81 of the discharged fuel atmospheric release line 80, and downstream of the discharged fuel circulation source valve 51 of the discharged fuel recirculation line 50. In this case, the bypass on-off valve 101 in the aforementioned embodiment is not provided.

The combined cycle power system 1B having the above configuration employs a fuel cell protection method in which the discharged fuel is released after the shutdown of the SOFC while the pressure on the high-temperature side is being maintained higher than that of the low-temperature side.

That is, the fuel inlet valve 31, the discharged fuel circulation source valve 51, the discharged fuel circulation outlet valve 53, the air inlet valve 41, and the discharged air outlet valve 61 in an open state are closed at the same time as the operation shutdown of the SOFC 10. The circulation of the fuel, the compressed air, the discharged fuel, and the discharged air is thereby blocked between the high-temperature portion inside and around the SOFC 10 and the low-temperature portion at the outside of the fuel cell.

Moreover, the discharged fuel release source valve 81 and the discharged air release source valve 91 in a closed state are opened at the same time as the operation shutdown of the SOFC 10. The discharged fuel and the discharged air are thereby released to outside of the high-temperature portion, so that the high-temperature portion is rapidly depressurized. Since the orifice 83 is provided in the discharged fuel atmospheric release line 80A, the pressure of the high-temperature portion at the fuel electrode 11 where the release flow passage has a large pressure loss is maintained higher than that of the low-temperature side. That is, since the orifice 83 is provided in the flow passage, the discharged fuel can be released to the atmosphere while the flow of the released discharged fuel is prevented from entering the high-temperature (high-pressure) side from the low-temperature (low-pressure) side.

As a result, even when the drain occurs in the discharged fuel recirculation line 50 on the low-temperature side, the drain can be prevented from flowing into the fuel electrode 11 on the high-temperature side.

In accordance with the aforementioned embodiments and the modifications, the high-temperature fuel cell such as the SOFC 10 requires no or a less amount of high-pressure inert gas when shut down. Consequently, in the combined cycle power systems 1, 1A, and 1B, the initial cost and the running cost of the entire system can be reduced.

The inside of the SOFC 10 can be rapidly depressurized to decrease the temperature in the shutdown of the SOFC 10. The drain can be also prevented from occurring in or entering the fuel cell from outside. Accordingly, the high-temperature fuel cell such as the SOFC 10 can be protected by suppressing the deterioration of the fuel cell.

That is, in accordance with the aforementioned embodiments and the modifications, the costs can be reduced by simplifying the facility for supplying inert gas such as a nitrogen facility. The SOFC can be also protected even in case of loss of power. Consequently, such excellent effects as to suppress the deterioration and improve the reliability and durability can be produced.

The present invention is not limited to the aforementioned embodiments, and, for example, may be applied to a high-temperature/high-pressure fuel cell other than the SOFC. Modifications may be made as appropriate without departing from the scope.

REFERENCE SIGNS LIST

1 Fuel cell/gas turbine power system
10 SOFC (fuel cell)
11 Fuel electrode
12 Air electrode
20 Gas turbine
21 Compressor
22 Combustor
23 Turbine
30 Fuel gas supply line
31 Fuel inlet valve
40 Compressed air supply line
41 Air inlet valve
50 Discharged fuel recirculation line
51 Discharged fuel circulation source valve
52 Booster blower section
53 Discharged fuel circulation outlet valve
60 Discharged air supply line
61 Discharged air outlet valve
70 Gas turbine fuel supply line
71 Discharged fuel supply source valve
80,80A Discharged fuel atmospheric release line
81 Discharged fuel release source valve
83 Orifice (pressure loss element)
90 Discharged air atmospheric release line
91 Discharged air release source valve
100,100A Discharged fuel release bypass line
101 Bypass on-off valve

The invention claimed is:

1. A combined cycle power system comprising:
    a fuel cell which generates electricity by an electrochemical reaction through an electrolyte upon supply of fuel gas and air;
    a gas turbine which is operated upon supply of discharged fuel and discharged air discharged from the fuel cell after the generation of electricity;
    a fuel gas supply line which includes
        a first flow passage that supplies the fuel gas to a fuel electrode of the fuel cell, and
        a fuel inlet valve provided in the first flow passage;
    a compressed air supply line which includes
        a second flow passage that supplies air compressed by a compressor of the gas turbine to an air electrode of the fuel cell, and
        an air inlet valve provided in the second flow passage;
    a discharged fuel recirculation line which includes
        a third flow passage that connects the fuel electrode and the fuel gas supply line to circulate the discharged fuel, and
        a discharged fuel circulation source valve, a booster blower section, and a discharged fuel circulation outlet valve provided in the third flow passage in order from an upstream side thereof;
    a discharged air supply line which includes
        a fourth flow passage that supplies the discharged air from the air electrode to a combustor of the gas turbine, and
        a discharged air outlet valve provided in the fourth flow passage;
    a gas turbine fuel supply line which includes
        a fifth flow passage that branches from the discharged fuel recirculation line between the discharged fuel circulation source valve and the booster blower section to supply a portion of the discharged fuel to the combustor, and
        a discharged fuel supply source valve provided in the fifth flow passage;
    a discharged fuel atmospheric release line which includes
        a sixth flow passage that branches from the discharged fuel recirculation line upstream of the discharged fuel circulation source valve, and
        a discharged fuel release source valve provided in the sixth flow passage;
    a discharged air atmospheric release line which includes
        a seventh flow passage that branches from the discharged air supply line upstream of the discharged air outlet valve, and
        a discharged air release source valve provided in the seventh flow passage; and
    a discharged fuel release bypass line which includes
        an eighth flow passage that connects the discharged fuel atmospheric release line and the discharged fuel recirculation line downstream of the discharged fuel release source valve and downstream of the discharged fuel circulation source valve, and a bypass on-off valve provided in the eighth flow passage.

2. The combined cycle power system according to claim 1, wherein the compressed air supply line includes a cooling air supply line which includes a flow passage connected to the compressed air supply line downstream of the air inlet valve, and a cooling air supply source valve provided in the flow passage.

3. The combined cycle power system according to claim 1, further comprising a replacement gas supply line which includes a flow passage connected to the discharged fuel recirculation line upstream and downstream of the discharged fuel circulation outlet valve, and a pair of replacement gas supply source valves respectively provided in the flow passages on the upstream side and the downstream side.

4. A combined cycle power system comprising:
a fuel cell which generates electricity by an electrochemical reaction through an electrolyte upon supply of fuel gas and air;
a gas turbine which is operated upon supply of discharged fuel and discharged air discharged from the fuel cell after the generation of electricity;
a fuel gas supply line which includes
a first flow passage that supplies the fuel gas to a fuel electrode of the fuel cell, and
a fuel inlet valve provided in the first flow passage;
a compressed air supply line which includes
a second flow passage that supplies air compressed by a compressor of the gas turbine to an air electrode of the fuel cell, and
an air inlet valve provided in the second flow passage;
a discharged fuel recirculation line which includes
a third flow passage that connects the fuel electrode and the fuel gas supply line to circulate the discharged fuel, and
a discharged fuel circulation source valve, a booster blower section, and a discharged fuel circulation outlet valve provided in the third flow passage in order from an upstream side thereof;
a discharged air supply line which includes
a fourth flow passage that supplies the discharged air from the air electrode to a combustor of the gas turbine, and
a discharged air outlet valve provided in the fourth flow passage;
a gas turbine fuel supply line which includes
a fifth flow passage that branches from the discharged fuel recirculation line between the discharged fuel circulation source valve and the booster blower section to supply a portion of the discharged fuel to the combustor, and
a discharged fuel supply source valve provided in the fifth flow passage;
a discharged fuel atmospheric release line which includes
a sixth flow passage that branches from the discharged fuel recirculation line upstream of the discharged fuel recirculation source valve, and
a pressure loss element and a discharged fuel release source valve provided in the sixth flow passage in order from an upstream side thereof;
a discharged air atmospheric release line which includes
a seventh flow passage that branches from the discharged air supply line upstream of the discharged air outlet valve, and
a discharged air release source valve provided in the seventh flow passage; and
a discharged fuel release bypass line as an eighth flow passage that connects the discharged fuel atmospheric release line and the discharged fuel recirculation line between the pressure loss element and the discharged fuel release source valve and downstream of the discharged fuel circulation source valve.

5. The combined cycle power system according to claim 4, wherein the compressed air supply line includes a cooling air supply line which includes a flow passage connected to the compressed air supply line downstream of the air inlet valve, and a cooling air supply source valve provided in the flow passage.

6. The combined cycle power system according to claim 4, further comprising a replacement gas supply line which includes a flow passage connected to the discharged fuel recirculation line upstream and downstream of the discharged fuel circulation outlet valve, and a pair of replacement gas supply source valves respectively provided in the flow passages on the upstream side and the downstream side.

* * * * *